March 29, 1932.  W. H. WEISKOPF  1,851,025
MEANS FOR TEMPORARILY SUPPORTING STRUCTURAL ELEMENTS
Filed Aug. 19, 1927  3 Sheets-Sheet 1
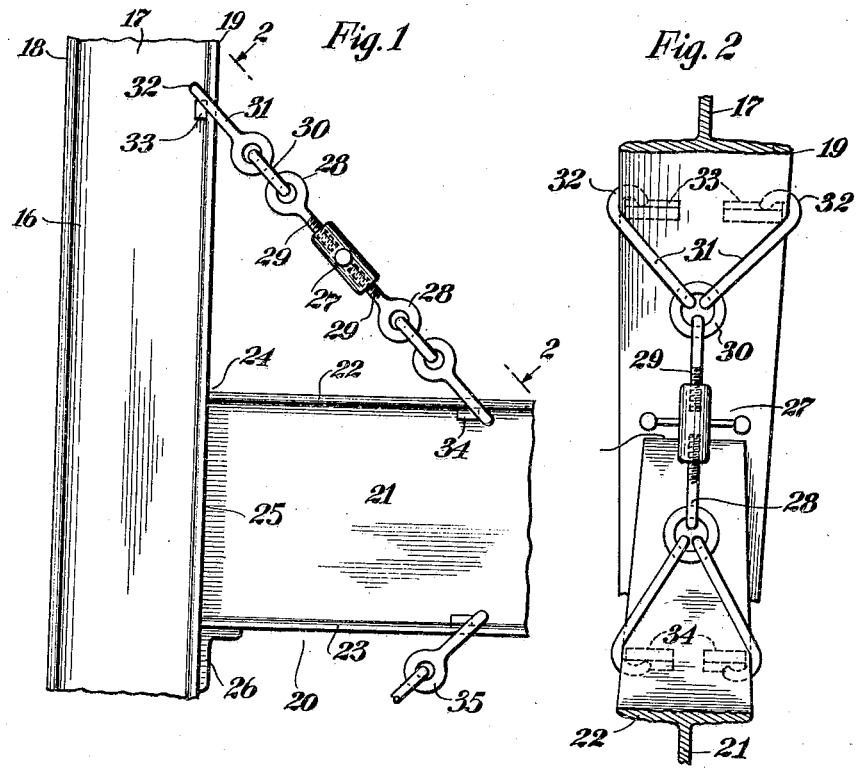
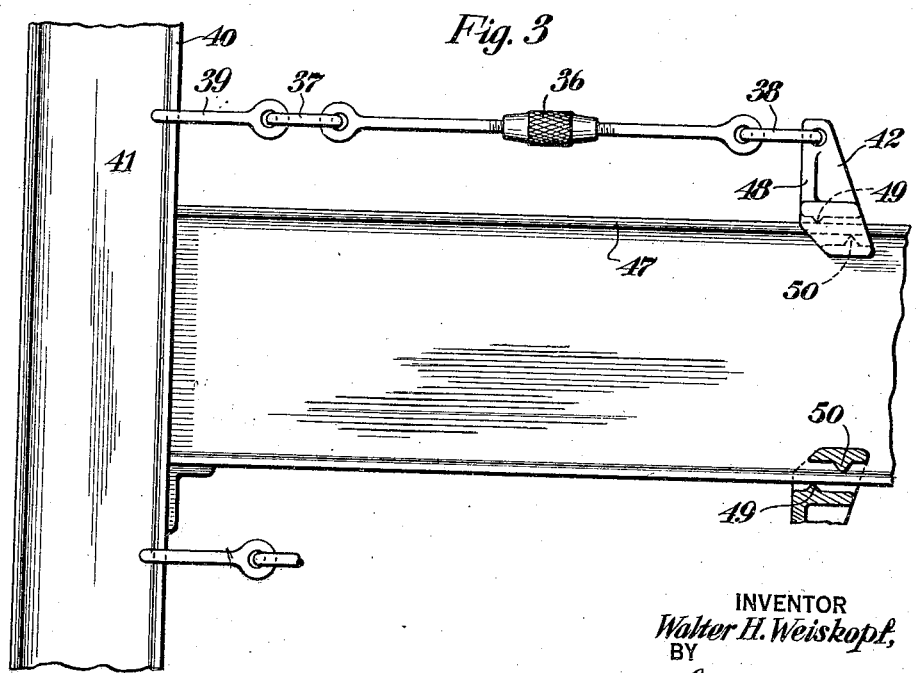
INVENTOR
Walter H. Weiskopf,
BY
Frederick Breitenfeld
ATTORNEY March 29, 1932.  W. H. WEISKOPF  1,851,025
MEANS FOR TEMPORARILY SUPPORTING STRUCTURAL ELEMENTS
Filed Aug. 19, 1927   3 Sheets-Sheet 2
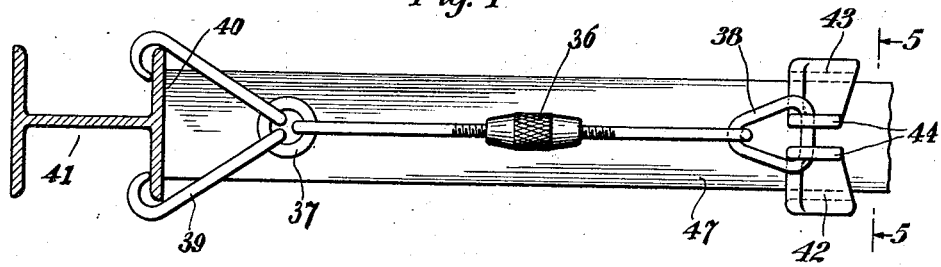
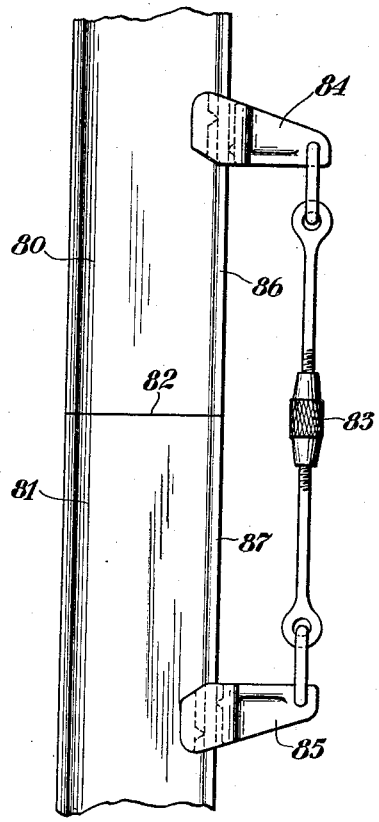
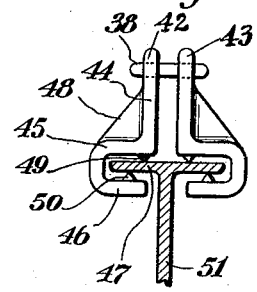
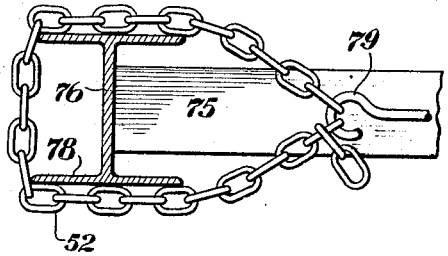
INVENTOR
Walter H. Weiskopf,
BY
Frederick Breitenfeld
ATTORNEY March 29, 1932. W. H. WEISKOPF 1,851,025
MEANS FOR TEMPORARILY SUPPORTING STRUCTURAL ELEMENTS
Filed Aug. 19, 1927 3 Sheets-Sheet 3
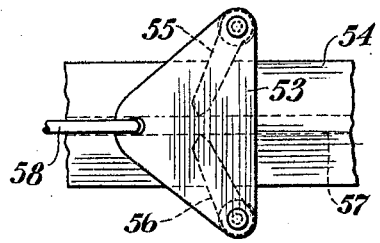
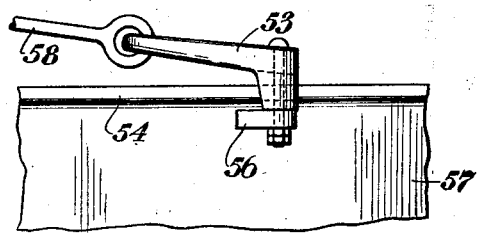
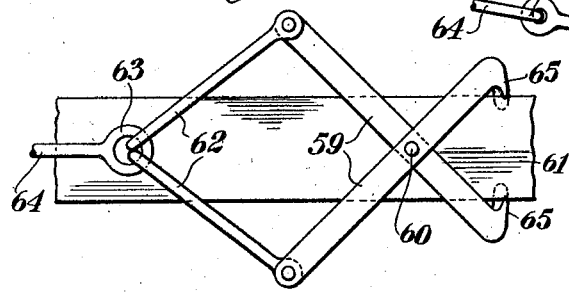
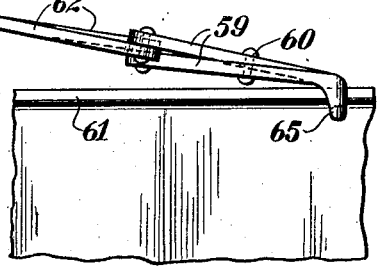
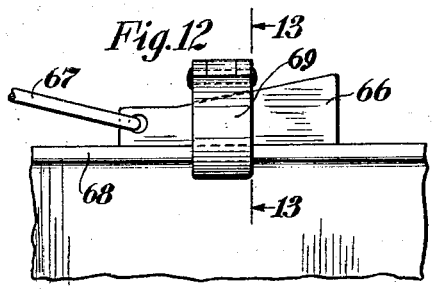
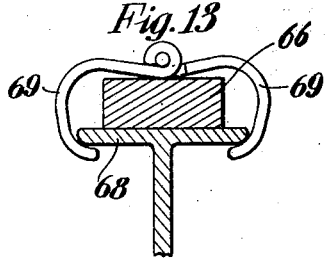
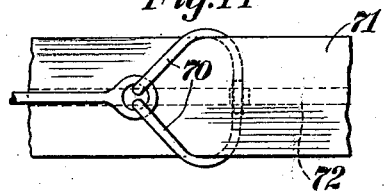
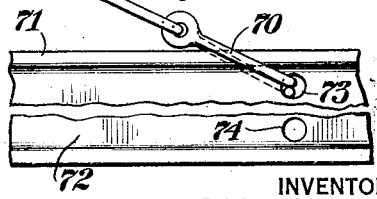
INVENTOR
Walter H. Weiskopf,
BY
Frederick Breitenfeld
ATTORNEY Patented Mar. 29, 1932

1,851,025

UNITED STATES PATENT OFFICE

WALTER H. WEISKOPF, OF NEW YORK, N. Y.

MEANS FOR TEMPORARILY SUPPORTING STRUCTURAL ELEMENTS

Application filed August 19, 1927. Serial No. 214,033.

My present invention relates generally to steel structures, more particularly to building structures, and has particular reference to certain improvements relating to the art of steel erection by means of welding as distinguished from riveting.

In the well-known method of erecting steel structures with the aid of rivets, the various beams and columns and auxiliary parts are provided in the shop with all the necessary punched openings subsequently to receive the rivets. These openings must be accurately positioned, and this necessitates the provision of drawings, the employment of templates and the like, and considerable handling and transportation of the structural elements. The latter are then, in the field, brought into proper mutual relationship, the pre-prepared and necessary holes for the rivets presenting themselves in proper alignment. As a matter of expediency, the rivets are not immediately driven. Instead, the steel work is erected in a temporary manner by means of ordinary bolts and nuts, the bolts passing through certain selected openings. Several stories below the temporary erection gang, the riveters commence the actual driving of the rivets, withdrawing the temporary bolts as they proceed.

In the comparatively new art of steel erection by means of welding, one of the problems arising is that of temporarily yet securely retaining the beams and columns in proper relationship preparatory to the actual welding operations. Inasmuch as rivet holes are wholly unnecessary, the use of bolts and nuts is either entirely impossible or necessitates the special provision in the shop of suitable openings to be used solely for this purpose. Inasmuch as one of the great advantages of welding, as distinguished from riveting, lies in the saving of time and labor heretofore necessitated for the accurate provision of rivet holes, it follows that any provision of accurately arranged holes—particularly for the sole purpose of temporary use—is a step backward and constitutes a procedure which mitigates this advantage.

It is an object of my present invention to provide a method and means for temporarily retaining structural elements in proper relationship and position, preparatory to mutual welding thereof, without the employment of bolts or the like and the accompanying necessity for accurately prepared holes therefor.

It is an important object of my invention to provide a device which can be employed repeatedly, and which is adaptable to the necessarily variable sizes and positions of the structural elements to be temporarily supported thereby. More particularly, it is an object of my invention to provide a temporary tie device which may be removably applied at a variety of points and in a variety of ways for holding constituent parts of the structure firmly and securely together preparatory to the welding operations which follow thereafter. The device is of a character which renders it simple to apply and equally simple to remove.

In preferred forms of my invention, the device embodies within itself practically all the necessary qualities and characteristics for securely holding the beams and columns together. In other forms of my invention, it is advantageous to pre-arrange relatively minor structural features in the columns and beams themselves during the prepartion thereof in the shop, or in certain cases, in the field.

My invention relates in its broadest aspects to the step or steps of procedure which comprise the releasable and temporary gripping of abutted structural elements at points spaced from the area of abutment, and the subsequent drawing together of these grasped points.

The features of the device which I have found practical for achieving the general objects of my invention lie in the provision of a temporary tie device having a medial portion adjustable to vary the length thereof, and means associated with the ends thereof for releasably grasping the desired points of the beams or columns to be joined. The last named means may comprise at least one pair of relatively adjustable gripping jaws, and it is a feature of my invention to provide these jaws in such a manner that a firm grasp may be effected under the necessarily variable conditions presented by beams of varying sizes and positional relationships.

Another feature of my invention lies in the provision of means arranged at the points of engagement between the tie device and the beams for preventing slippage of the engaging jaws along the engaged beam or beams. In one form of my invention, I provide previously prepared lugs or abutments upon the flanges of the beams; in another form, I provide openings in the webs of the beams, the openings being inexpensively providable since no accurate alignment is necessary; and in another form I provide gripping jaws which are so constructed that slippage along the beams is practically impossible.

For the attainment of the foregoing objects and such other objects as may hereinafter appear or be pointed out, I have illustrated several embodiments of my invention in the accompanying drawings in which Fig. 1 is a vertical side view of a typical flanged column and a flanged beam abutted thereagainst, showing one form of my invention applied thereto;

Fig. 2 is a diagonally downward view taken along the line 2—2 of Fig. 1;

Fig. 3 is a view similar to Fig. 1 showing a modified form of tie device;

Fig. 4 is a plan view of Fig. 3;

Fig. 5 is a fragmentary end view taken substantially along the line 5—5 of Fig. 4;

Fig. 6 is a vertical side view, similar to Fig. 1, showing my invention applied to two longitudinally abutting columns;

Fig. 7 is a fragmentary plan view similar to Fig. 4, showing a modification;

Figs. 8 and 9 are plan and side views of a modification;

Figs. 10 and 11 are plan and side views of a modification;

Figs. 12 and 13 are side and cross-sectional views of a modification; and

Figs. 14 and 15 are plan and side views of a modification.

In Figure 1 I have shown a typical structural steel column 16 having a medial web portion 17 and two parallel outer flanges 18 and 19, the column illustrated being of H cross-section. Abutted thereagainst, perpendicularly, I have shown a typical I-beam 20 having a web 21 and top and bottom flanges 22 and 23. The beam 20 is shown abutted against the flange 19 of the column 16, and when the structure is ultimately welded, a bead of welding will probably be applied in the angle 24 and also in the angles 25 on opposite sides of the web 21.

In an abutment of the character illustrated I have found it desirable to provide an angle 26 upon the flange 19, upon which angle the abutting end of the beam 20 may rest as it is initially positioned by the derrick or hoist and before or during the application of the temporary tie devices of my invention. The angle 26 is not meant to serve any permanent supporting function.

In the embodiment of Figs. 1 and 2 I have shown a temporary tie device comprising a medial adjustable tie portion 27, the latter being provided with loops 28 at its opposite ends. The adjustability is provided by mounting the loops 28 upon threaded bolt portions 29 engaging into the opposite ends of an internally threaded adjusting member. Linking with each loop 28 is a link member 30, and carried by the latter are two relatively adjustable gripping jaws 31. The jaws are looped at their rear ends to engage the link 30, and extend divergently away from the link 30 with their outer ends 32 disposed inwardly and adapted to engage about the flange 19. A similar set of jaws may be arranged at the other end of the tie portion 27.

In Figures 1 and 2, I have shown the possibility of providing lugs 33 or their equivalent upon the inner surface of the flange 19, and I have shown the provision of similar lugs 34 upon the under surface of the flange 22; these lugs or their equivalents being preferably provided in the shop and being spaced from the area of abutment. The ends 32 are rounded and have curved surfaces so that when the jaws are engaged about a flange, such as the flange 19, these ends may find support upon the lugs 33 regardless of the obliquity which the tie device as a whole assumes. The angularity of the tie device will depend upon the relative positions of the lugs (or recesses), and this positional relationship will vary with differing beams and columns. The rounded configuration of the jaw ends will permit the jaws to secure a firm, non-slipping hold about the flanges.

A similar device is made to span the angle formed beneath the beam 20, the upper portion 35 of this device being visible in Fig. 1. Thus it will be seen that the beam 20 has been grasped at points spaced from the area of abutment and that a tightening of the tie devices will draw these grasped points diagonally upwardly and downwardly toward the column 16. This will serve to hold the beam 20 in firm abutment against the column 16 and will provide a temporary supporting device sufficiently strong and rigid to permit a number of additional stories of structural steel work to be erected in this manner. It will be understood that when the welding is effected, the tie devices are removed and are then ready for re-employment at other similar portions of the structure.

In Figs. 3, 4, and 5, I have illustrated a modified form of tie device wherein a pair of jaws has been provided which does not necessitate the provision of lugs or abutments upon the beams to prevent slipping. Furthermore, the jaws of Figures 3–5 are of such a character as to permit the medial tie portion to assume a parallel but offset position with respect to one of the structural elements, thereby permitting an ordinary pair of jaws to be associated with the opposite end despite the absence of lugs at said end. Thus, the tie portion 36 of Figs. 3-5, provided with links 37 and 38, has a pair of jaws 39 associated with the link 37 and engaging about the flange 40 of a column 41 at substantially right angles to said flange. The link 38 has a pair of jaws 42 and 43 associated therewith, and the link 38 is preferably somewhat triangular in shape, as shown in Figure 4.

Referring to Figure 5, it will be noted that each jaw has a rear portion 44, apertured to permit positioning thereof about the link 38, and extending angularly away from the longitudinal axis of the tie portion 36. The end of the jaw is substantially U-shaped, having portions 45 and 46 adapted to engage with opposite surfaces of the flange 47 respectively. A stiffening web 48 may advantageously be made to extend between the portions 44 and 45.

The portion 45 is provided with a projection or point of contact 49, and the portion 46 is provided with a similar point of contact 50, these points being offset with respect to each other both longitudinally and laterally. Thus, in Fig. 5, it will be seen that the point 49 is nearer to the web 51 than the point 50. And in Fig. 3, it will be noted that the point 49 is nearer to the column 41 than the point 50. This offset relationship, particularly the one illustrated in Fig. 3, causes the jaw to engage the flange 47 more tightly as the tie portion 36 is shortened, or, in other words, as there is applied to the rear portion of the jaw a tension along a direction substantially parallel to the flange.

In Figure 7, I show the possible employment of a chain 52 or the equivalent thereof in connection with the column end of the device of Figure 3. Such a chain is advantageously employed where a beam 75 abuts the web 76 of a column 78 instead of abutting one of the flanges of the latter, although its useful employment is not limited to such cases. The chain passes about the entire column, and a hook 79 may be made to engage with selected links thereof. The hook is connected to an adjustable tie portion and the employment of the chain permits rough adjustments to be made by proper selection of the links for engagement thereby, the final tightening being then effected by the tie portion. It will be obvious that substantially horizontal tension upon the tie portion (not shown in Figure 7) will cause the beam 75 to be securely held in proper abutment with the web of the column 78.

In Figure 6 I have illustrated the employment of jaws constructed like the jaws 42 and 43 in the temporary supporting of two columns in longitudinal abutment with each other. Thus, the columns 80 and 81, longitudinally abutted at 82, may be held in this abutment by the employment of a tie device having a medial adjustable tie portion 83, and two pairs of jaws 84 and 85 arranged at opposite ends of the portion 83. The jaws 84 and 85 are so constructed and arranged as to engage about the flanges 86 and 87 respectively and to project their rear ends away from said flanges. In this manner, the medial tie portion 83 may be made to position itself in the convenient parallel offset position illustrated in Figure 6, and tightening of the tie portion 83 will obviously draw the two columns toward each other and hold them in secure abutment. If desired, a similar device may be applied to the flanges opposite the flanges 86 and 87.

Figures 8 and 9 illustrate a grasping device wherein a supporting member 53 is adapted to overlie the entire flange 54 of a beam and to extend somewhat beyond each edge thereof, and wherein two pivoted arms 55 and 56 extend inwardly from the overhanging ends of the member 53 and engage the web 57 of the beam. The arms 55 and 56 are substantially parallel to the flange 54 and are of such properly designed lengths as to cause them to position themselves with their free inner (or biting) ends directed toward the direction of tension. Obviously, the firmness of grasp will increase as tension is applied to the member 53 by adjustment of the tie portion 58.

In the employment of this modified form, the member 53 and associated arms 55 and 56 are first positioned wherever requiremnts prescribe, then a well-directed blow from a hammer will swing each arm inwardly into jammed engagement with the web 57, and thereupon adjustment of the tie portion will draw the grasped beam toward the column.

In the modification of Figures 10 and 11, two jaws 59 pivot like tongs at 60 and are provided with attenuated ends inwardly disposed which are designed to grasp the opposite edges of the beam flange 61. The rear ends of the jaws 59 are pivotally connected to arms 62 which extend inwardly into linked engagement with a ring 63. Tension upon the latter (by adjustment of the tie portion 64) will cause the jaws to grasp more firmly; and by properly designing the relative lengths of the lever arms the grasp can be made amply secure for safety. Each jaw 59 is advantageously provided with a U-shaped end 65 adjacent to the grasping points for encircling the flange edge and thereby preventing outward slippage of the jaws.

The contacting surface of the end 65 is preferably curved to render the device efficiently applicable under variable angles of obliquity.

Figures 12 and 13 illustrate a grasping device which embodies the principle of the wedge, a wedge member 66 being connected to the tie portion 67 and adapted to overlie the beam flange 68. A pair of hinged U-shaped arms or jaws 69 are adapted to engage about opposite edges of the flange and are provided with portions which overlie the wedge member 66. When tension is applied to the wedge, the arms 69 are caused to grasp the flange edges with increasing firmness.

I have also found it feasible to employ a pair of wedge members, each cooperating in a similar manner with a U-shaped arm which is not necessarily hinged to the other arm and which engages about one of the flange edges.

In the event that lack of confidence in pure frictional grasp may prescribe more positive means, a device of the character shown in Figures 14 and 15 may be employed. A pair of hooks or jaws 70, similar to the jaws of Figure 1, may be so constructed and arranged as to extend not only around opposite edges of the flange 71, but also thence through the web 72 of the beam. For this purpose I provide openings 73 and 74, the ends of the jaws 70 arranging themselves in overlapping relationship therein.

I wish to point out that the provision of the openings 73 and 74 is not a procedure which mitigates the advantageous features of my method of temporary erection since these openings need not be accurately positioned. Accordingly, they need not be punched, but may be roughly burned out or formed by other inexpensive means either during the rolling of the beam or in the field.

Obviously, innumerable other modifications will suggest themselves to those skilled in the art, certain of the features disclosed being combinable in various ways. Furthermore, the constituent parts of the tie devices may be altered in a number of ways to suit differing requirements. Even the devices illustrated may be themselves employed in a variety of ways and under a variety of circumstances dependent solely upon differing requirements presented by differing portions of a structure. For these and other obvious reasons, it will be understood that many changes in the details herein described and illustrated for the purpose of explaining the nature of my invention may be made by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is:

1. For use in the process of erecting a steel structure which includes a flanged column and a flanged beam abutting the column at an angle, a temporary tie device removably applicable across said angle to retain said column and beam in said abutting relationship; said device comprising a medial tie portion provided with means for adjusting the length thereof, means associated with each end of said medial portion for engaging the column and beam respectively, said last named means comprising at least one pair of laterally adjustable gripping jaws adapted to engage about one of said flanges; and means arranged at the points of engagement of said jaws to prevent slippage of the jaws along the flange.

2. In a steel structure which includes a flanged column and a flanged beam abutting the column at an angle, a removably applicable tie device for the column and beam and spanning said angle, said device comprising a medial adjustable portion, two pairs of gripping jaws oppositely arranged at opposite ends of said medial portion, each pair of said jaws being constructed and arranged to engage in a removable manner about one of said flanges, and means for adjusting said medial portion to alter the length thereof and thereby permit tightening or loosening of the tie device.

3. In a steel structure including a flanged column and a flanged beam abutting the column substantially perpendicularly, an independent tie device removably applicable in a diagonal manner between the column and beam respectively, said tie device including a pair of jaws adapted to engage about one of said flanges, and means associated with the engaged flange at the points of engagement for preventing slippage of the tie device along said engaged flange.

4. In a steel structure including a flanged column and a flanged beam abutting the column substantially perpendicularly, an independent tie device removably applicable in a diagonal manner between the column and beam respectively, said tie device including a pair of jaws adapted to engage about one of said flanges, and abutments associated with the engaged flange at the points of engagement for supporting the jaws and preventing slippage of the latter along said flange.

5. For use with flanged structural beams abutting each other at substantial right angles and provided with abutments on said flanges, a removably applicable diagonal tie device for temporarily supporting said beams in said abutting relationship, said device comprising two oppositely arranged pairs of jaws, and intermediate means for adjusting the distance between said pairs, each pair of jaws being constructed and arranged to engage about one of said flanges and find support against the abutments on said flange regardless of the angularity of the device.

6. For use with flanged structural beams abutting each other at substantial right angles and provided with lugs on said flanges, a removably applicable tie device for temporarily supporting said beams in said abutting relationship, said device comprising two oppositely arranged pairs of jaws, and intermediate means for adjusting the distance between said pairs, each pair of jaws being constructed and arranged to engage about one of said flanges and find support against the lugs on said flange, and each jaw having a rounded end with a curved surface to permit the device to be applied obliquely between the beams and to support itself firmly at variable angles of obliqueness dependent upon the relative positions of said lugs.

7. A temporary tie device for application along a hypothenuse to perpendicularly abutted flanged beams in order to retain said beams firmly in said abutting relationship, said device comprising a medial adjustable tie portion, and a pair of jaws at one end thereof, said jaws being so arranged and constructed as to engage firmly about opposite edges of one of said flanges, and said jaws being mutually adjustable to permit engagement thereof about flanges of variable widths.

8. For use in the process of erecting a steel structure which includes two abutting structural steel beams at least one of which has a web and a flange, a temporary tie device removably applicable to said beams to retain them in abutting relationship, said device comprising a medial tie portion provided with means for adjusting the length thereof, and means associated with the opposite ends of said medial portion for engaging said beams, said last-named means including a pair of laterally adjustable gripping jaws adapted to engage about said flange, and means carried by said jaws for causing the engagement of the flange to become more secure as the medial tie portion is shortened in length.

9. For use in the process of erecting a steel structure which includes two abutting structural steel beams at least one of which has a web and a flange, a temporary tie device removably applicable to said beams to retain them in abutting relationship, said device comprising a medial tie portion provided with means for adjusting the length thereof, and means associated with the opposite ends of said medial portion for engaging said beams, said last-named means including a pair of laterally adjustable gripping jaws adapted to engage about said flange, each jaw having portions which engage with the outer and inner surfaces of the flange, respectively, said portions being offset with respect to each other so that the engagement of the flange will become more secure as the medial tie portion is shortened.

In witness whereof, I have signed this specification this 15th day of August, 1927.

WALTER H. WEISKOPF.